US008219131B2

(12) United States Patent
Yamaoka et al.

(10) Patent No.: US 8,219,131 B2
(45) Date of Patent: Jul. 10, 2012

(54) COGNITIVE WIRELESS COMMUNICATION SYSTEM

(75) Inventors: Ryouji Yamaoka, Mitaka (JP); Junji Yamamoto, Tokyo (JP); Koji Wakayama, Kokubunji (JP); Seishi Hanaoka, Tokyo (JP); Takehiro Morishige, Kawasaki (JP); Masashi Yano, Kawasaki (JP); Toshiaki Suzuki, Hachioji (JP); Satoshi Yoshizawa, Beijing (CN)

(73) Assignee: Hitachi, Ltd., Tokyo (JP)

( * ) Notice: Subject to any disclaimer, the term of this patent is extended or adjusted under 35 U.S.C. 154(b) by 1221 days.

(21) Appl. No.: 12/007,164

(22) Filed: Jan. 7, 2008

(65) Prior Publication Data

US 2008/0182605 A1 Jul. 31, 2008

(30) Foreign Application Priority Data

Jan. 31, 2007 (JP) .................... 2007-20357

(51) Int. Cl.
  *H04B 7/00* (2006.01)
(52) U.S. Cl. ...................... 455/507; 455/332; 455/435.3; 455/458; 455/512; 455/515; 370/329
(58) Field of Classification Search .................. 455/507, 455/332, 343, 435.1, 426.1, 435.2, 435.3, 455/458, 512, 515; 370/329, 341, 444, 455
See application file for complete search history.

(56) References Cited

U.S. PATENT DOCUMENTS

| 6,771,964 B1 | 8/2004 | Einola et al. |
| 2001/0009853 A1 | 7/2001 | Arimitsu |
| 2002/0085516 A1 | 7/2002 | Bridgelall |
| 2003/0036416 A1 | 2/2003 | Pattabiraman et al. |
| 2004/0203777 A1 | 10/2004 | Watanabe et al. |
| 2004/0204071 A1 | 10/2004 | Bahl et al. |
| 2005/0036468 A1 | 2/2005 | Miyabayashi et al. |
| 2005/0037770 A1 | 2/2005 | Takeda et al. |
| 2005/0159153 A1* | 7/2005 | Mousseau et al. ......... 455/432.1 |
| 2006/0116148 A1 | 6/2006 | Bahl et al. |
| 2007/0091845 A1* | 4/2007 | Brideglall ..................... 370/331 |

FOREIGN PATENT DOCUMENTS

| EP | 1 009 183 A1 | 6/2000 |
| JP | 11-252660 | 3/1998 |
| JP | 2000-175244 | 6/2000 |
| JP | 2001-197538 | 7/2001 |

(Continued)

OTHER PUBLICATIONS

Office Action from Japanese Patent Office dated Dec. 16, 2008 in Japanese.

(Continued)

*Primary Examiner* — Shaima Q Aminzay
(74) *Attorney, Agent, or Firm* — Stites & Harbison, PLLC; Juan Carlos A. Marquez, Esq (57) ABSTRACT

To prevent a hung-up of communications due to changes in a radio wave condition resulting from frequent displacement of the terminals and changes in a number of the terminals, and to realize switching of the radio systems adapting to the radio condition. A radio communication system comprising: a base station for providing a plurality of radio systems, and terminals for communicating with the base station through the plurality of radio systems. The base station decides a priority of the radio system on which the each terminal will communicate thereafter and transmits paging signals of one of the plurality of radio systems which includes information on the decided priority to the each terminal.

10 Claims, 12 Drawing Sheets

FOREIGN PATENT DOCUMENTS

| | | |
|---|---|---|
| JP | 2001-285337 | 10/2001 |
| JP | 2003-169379 | 12/2001 |
| JP | 2004-517574 | 12/2001 |
| JP | 2003-510920 | 3/2003 |
| JP | 2004-312589 | 4/2003 |
| JP | 2003-134569 | 5/2003 |
| JP | 2004-135258 | 5/2003 |
| JP | 2003-169379 | 6/2003 |
| JP | 2003-199134 | 7/2003 |
| JP | 2003-229800 | 8/2003 |
| JP | 2004-030506 | 1/2004 |
| JP | 2004-356888 | 12/2004 |
| JP | 2005-20477 | 1/2005 |
| JP | 2005-500745 | 1/2005 |
| JP | 2006-217327 | 2/2005 |
| WO | WO 01/22764 A1 | 3/2001 |
| WO | WO 02/054820 A3 | 12/2001 |
| WO | WO 02/054820 A2 | 7/2002 |
| WO | WO 03/017596 A2 | 2/2003 |

OTHER PUBLICATIONS

Office Action from Japanese Patent Office dated Mar. 17, 2009 in Japanese.

Wu, Gang et al.; "MIRAI Architecture for Heterogeneous Network", Communications Magazine, Feb. 2002, pp. 126-134.

Harada, Hiroshi; "A Study on Cognitive Radio and Its Applications"; IEICE Technical Report; vol. 105, No. 36, The Institute of Electronics, Information and Communication Engineers, May 2005, pp. 117-124.

Takizawa, et al.; "Evaluation of Traffic Control Method for Multi-Hop Access Route in Cognitive Wireless Networks", IPSJ SIG Technical Report; vol. 2006 No. 120; Information Processing Society of Japan; Dec. 2006.

Japanese Office Action dispatched on Nov. 15, 2011 for Japanese Patent Application No. 2009-032006 (4 pages) which is a Divisional application of Japanese Application No. 2007-020357 which is the counterpart of U.S. Appl. No. 12/007,164, Partial concise explanation.

Japanese Office Action dispatched on Aug. 16, 2011 for Japanese Patent Application No. 2009-032006 (4 pages) which is a Divisional application of Japanese Application No. 2007-020357 which is the counterpart of U.S. Appl. No. 12/007,164.

Office Action from Japanese Patent Office in corresponding Japanese Application No. 2007-20357 (Japanese Publication No. 2009-032006), mailed Nov. 15, 2011.

The "e-Japan Priority Plan—2004", (Jun. 2004) established by the IT Strategy Headquarters of the Ministry of Internal Affairs and Communications, http://www.kantei.go.ip/ip/singi/it2/kettei/eka[am2004/040615honbun.html. See especially Chapter IV, p. 105 in Japanese, with 1 page of English abstract.

Joseph Mitola III, "Cognitive Radio for Flexible Mobile Multimedia Communications", 1999 IEEE Int'l Workshop of Mobile Multimedia Communications Digest (Nov. 1999), pp. 3-10.

Joseph Mitola III et al., "Cognitive Radio: Making Software Radios More Personal", 1999 IEEE Personal Communication, vol. 6, No. 4 (1999), pp. 13-18.

\* cited by examiner

PRIORITY INFORMATION OF RADIO SYSTEM TO BE COMMUNICATED NEXT

COGNITIVE WIRELESS COMMUNICATION SYSTEM

CLAIM OF PRIORITY

The present application claims priority from Japanese patent application JP 2007-20357 filed on Jan. 31, 2007, the content of which is hereby incorporated by reference into this application.

BACKGROUND OF THE INVENTION

The present invention relates to a radio communication system in which a terminal communicates by using a plurality of radio systems, and in particular a high-speed switching technology between a plurality of radio communication systems and a cognitive communication technology for improving the time use efficiency of frequency.

BACKGROUND OF THE INVENTION

The band of 6 GHz or less convenient for mobile communication systems (VHF, UHF, low micro band) is now used densely for communication by the third generation mobile phone, wireless LAN and the like and the tight condition of frequency is getting increasingly serious. Under such a situation, in order to use effectively and efficiently radio wave whose availability is getting increasingly stringent and to obtain allocation of frequency band necessary for mobile communication for which the needs are high, a technology for realizing a high-level common use of radio wave among systems using a plurality of radio waves such as mobile communication is sought after.

On the policy level, the "e—Japan priority plan—2004" (June, 2004) established by the IT Strategy Headquarters of the Ministry of Internal Affairs and Communication of Japan sought a technology for realizing "the putting to practical use by 2011 a radio communication system for establishing an optimum communication environment by determining precisely the requirements of the radio wave environment and the applications used, and flexibly selecting frequency band, modulation method, multiplexing method and the like.

In order to realize these requirements, the idea of "cognitive radio" for recognizing the state of the radio and controlling the resources of radio systems depending on the state thereof was published in 1999 (Mitora, "Cognitive radio for flexible multimedia communications", 1999 IEEE Int Workshop on Mobile Multimedia Communications Digest (November 1999), and Mitora, "Cognitive Radio: Making Software Radios More Personal", 19999 IEEE Personal Communication, vol. 6, No. 4 (1999)). However, there are a variety of approaches for realizing cognitive radio, and the parties concerned are studying the problem at present.

For communications using a multimode radio system, a technology in which the base station side decides the radio system and the base station side designates the radio system to the terminal side has been proposed (JP 2003-169379 A, JP 2005-20477 A).

SUMMARY OF THE INVENTION

In a system having a plurality of radio systems in which the network side decides the radio system and allocates the same to the terminal side, in an environment in which a large number of terminals move frequently and the radio wave condition changes, even if the base station sides designates the communication system for the subsequent communication and transmits the same to terminals, actually the radio system may not be used by changes in the radio wave condition.

JP 2003-169379 A and JP 2005-20477 A discloses that the base station side designates only a radio system for the subsequent communication and communicates the same to the terminal side. And the radio system is decided only by the base station side and the information on the terminal side is not taken into consideration. Therefore, the radio wave condition changes due to frequent displacement of terminals or changes in the number of terminals, the radio system decided only by the base station may not be usable.

A representative aspect of this invention is as follows. That is, there is provided a radio communication system comprising: a base station for providing a plurality of radio systems, and terminals for communicating with the base station through the plurality of radio systems. The base station decides a priority of the radio system on which the each terminal will communicate thereafter and transmits paging signals of one of the plurality of radio systems which includes information on the decided priority to the each terminal.

According to the aspect of the present invention, it is possible to prevent the hung-up of communications due to changes in the radio wave condition resulting from frequent displacement of terminals and changes in the number of terminals, and to realize switching of radio systems adapting to the radio condition.

The problems that the present invention tries to solve, the features of the present invention and the operation of the present invention shall be clarified by the embodiments described below with reference to drawings below.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

We will describe below the embodiments of the present invention with reference to drawings.

First Embodiment

Figure 1:
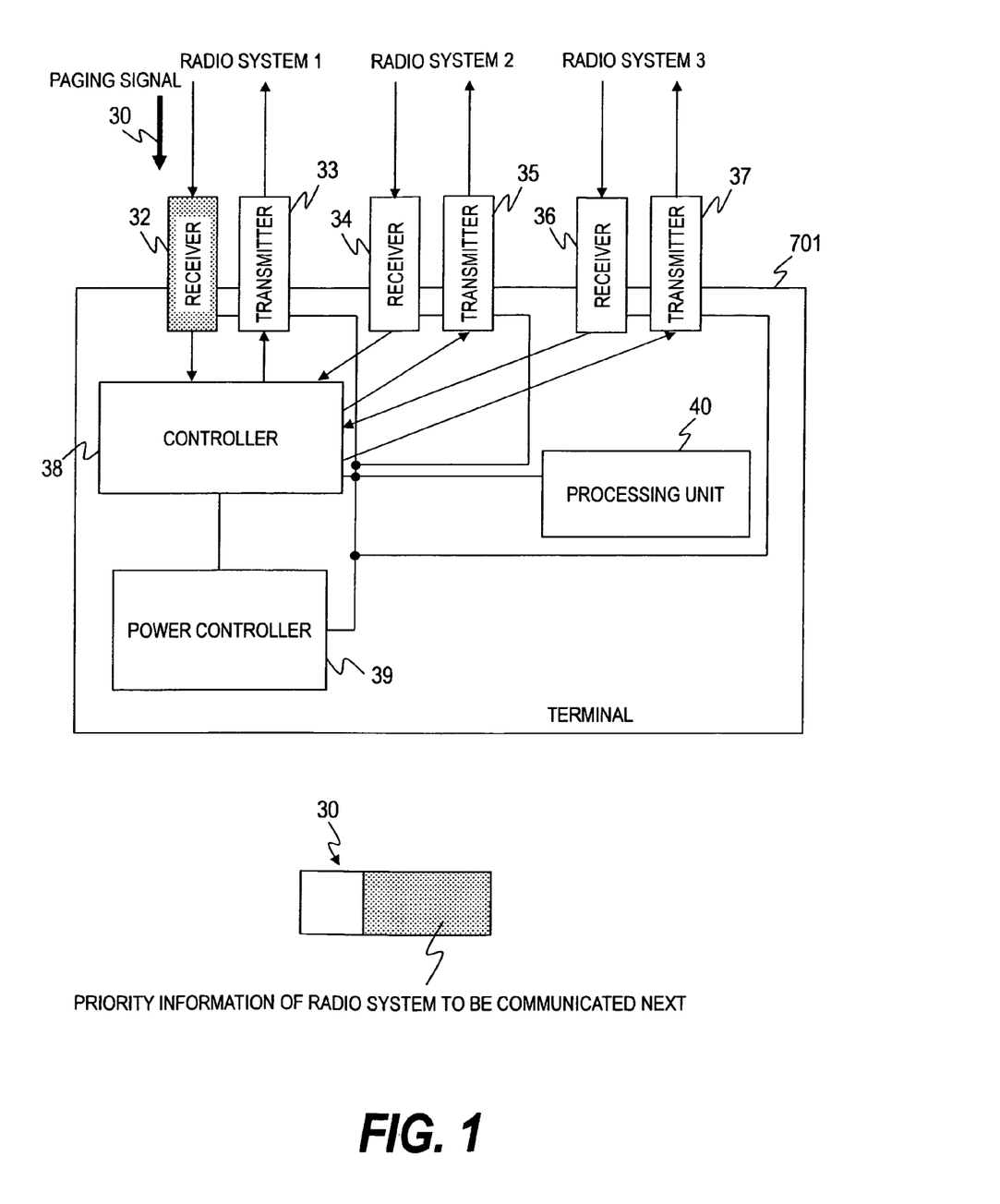
FIG. 1 is a block diagram showing a configuration of a terminal apparatus used in a multimode radio system in accordance with a first embodiment of the present invention.

FIG. 1 is a block diagram showing the configuration of a terminal apparatus, such as a mobile terminal apparatus, used in the multimode radio system of the first embodiment of the present invention. In this embodiment, we will describe the operation of the terminal apparatus using a plurality of radio systems as shown in FIG. 1.

The paging signal 30 according to the radio system 1 transmitted from the base station side is accompanied by the ID information on which the priority of the radio system to be used hereafter (for example, the following radio system to be used) is added. This paging signal 30 is received by the receiver 32 of the radio system 1 on the terminal side. The controller 38 of the radio system 1 controls the data in the physical layer and the MAC layer. The controller 38 of the radio system 1 decides the radio system for the following communication based on the ID information which includes the priority of this radio system, information on the radio systems available for the terminal side, and information on the radio system that the terminals request to use.

The information on the radio system that terminals request to use is stored in the processing unit 40. The information on the radio system that the terminal side can use is arranged in order by the controller 38 based on the information obtained from the receiver 32 of the radio system 1, the receiver 34 of the radio system 2 and the receiver 36 of the radio system 3. Specifically, the controller 38 converts the information obtained from radio systems having different timing of obtaining information (for example, the speed of obtaining data) into comparable forms (for example, compensation and/or normalization).

The controller 38 of the radio system 1 notifies the power controller 39 of the ID information of the radio system for the following communication. The power controller 39 transmits wake up message to the receivers (32, 34 or 36) of the radio system which includes the ID information and set the receiver in an active state (the state in which the receiver is fully supplied with power). It transmits sleep message to other receivers that are not charged to communicate, and set them in a sleep state (operating state with the minimum power necessary).

The priority ID information is not necessary transmitted by the paging signals of the radio system 1, and the paging signals of the radio system 2 or the paging signals of the radio system 3 may be used. For example, ordinarily priority information may be transmitted by the paging signals of the radio system 1 having a wide communication area. However, the paging signals of the radio system 2 or the paging signals of the radio system 3 may be used for transmitting priority information when the paging signals of the radio system 1 cannot be used.

Figure 2:
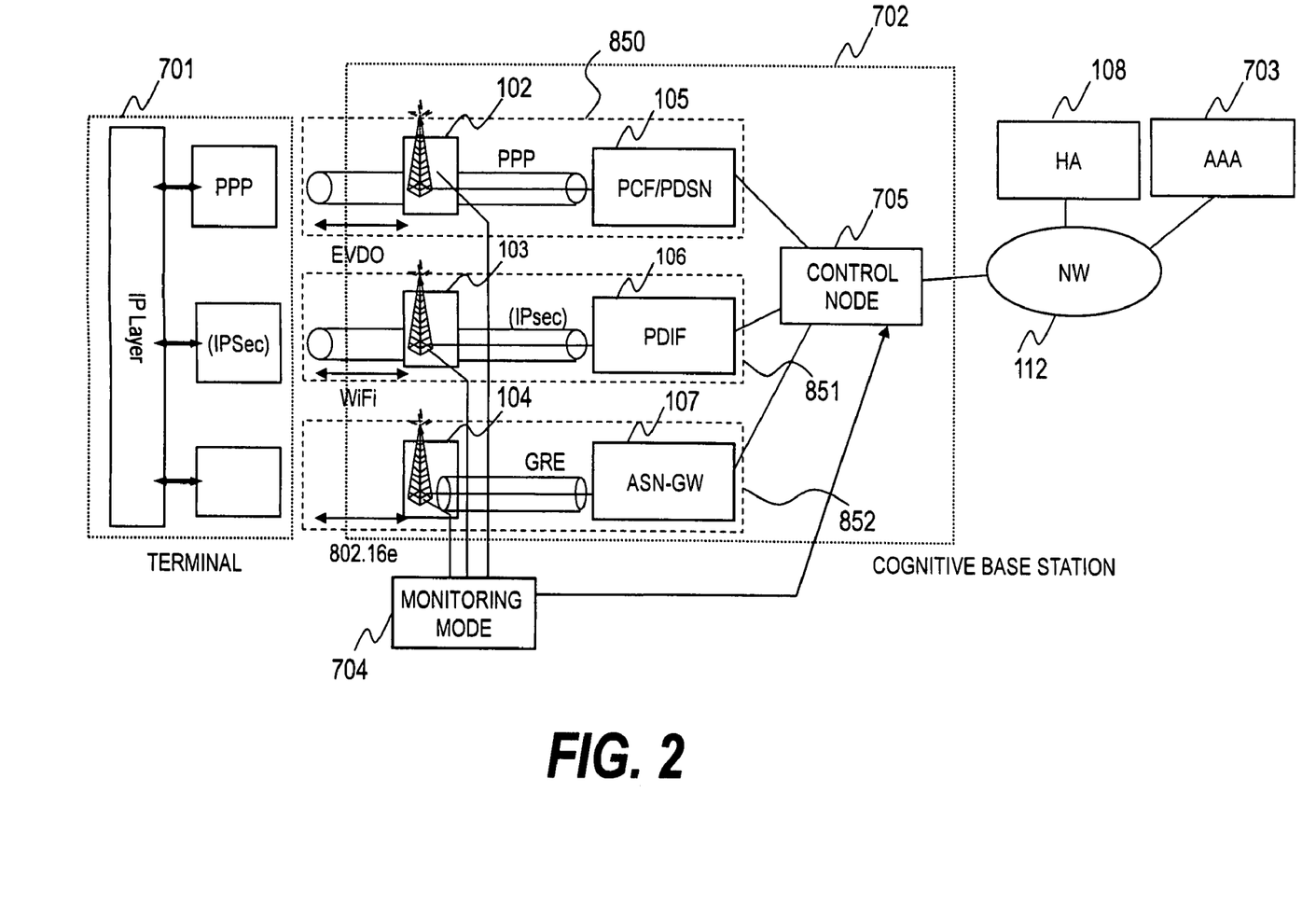
FIG. 2 is an diagram showing a configuration of the multimode radio system in accordance with the first embodiment of the present invention.

FIG. 2 is a diagram showing a configuration of the multimode radio system including the base station for transmitting paging signals of the radio system 1 described with reference to FIG. 1.

According to the example shown in FIG. 2, a total of three systems in all constituted by cdma 1× EVDO (1× Evolution Data Only) as the central system, WiMAX as an outdoor broadband system in urban areas, and wireless LAN (Local Area Network) as short-distance and indoor broadband system are connected and integrated. Any other systems having the equivalent function can be applied to the radio system of the present invention.

The communication system according to the first embodiment of the present invention includes a cognitive terminal 701, a cdma 2000 EV-DO radio base station 102, a wireless LAN base station 103, a WiMAX radio base station (104), a gateway device of the EV-DO radio system (PDSN: Packet Data Serving Node) 105, a gateway device of the wireless LAN system (PDIF: Packet Data Interworking Function) 106, and a gateway device for WiMAX system (ASN-GW: Access Serving Network Gateway) 107, a HA (Home Agent) 108, certificate common stations (AAA) 703, monitoring node 704 and network 112. The cognitive base station 702, includes cdma 2000 EV-DO radio base stations 102, wireless LAN base stations 103, WiMAX radio base stations 104, PCF/PDSN105, PDIF106, and ASN-GW107 and HA 108.

The cognitive base station 702 includes monitoring nodes (CMT: Cognitive Monitoring Tool) 704 for identifying the respective radio environment of different radio systems and obtains information on the radio systems (for example, information relating to the state of each system) from the access point of each system by the monitoring nodes 704. The monitoring node 704 obtains the information on the radio system from the access point of each system (cdma 2000 EV-DO radio station 102 in the case of EVDO, wireless LAN base station 103 in the case of wireless LAN, WiMAX radio base station 104 in the case of WiMAX).

And a control node 705 is implemented between the gateway of each radio system (PDSN105 in the case of EVDO, PDIF106 in the case of wireless LAN, and ASN-GW 107 in the case of WiMAX) and the network 112. The control node 705 decides the priority of radio system for the following communication according to the instructions from the monitoring node 704.

The information on the radio system includes the received power, RSSI (Received Signal Strength Indication), throughput of each user, transmission rate, packet loss, number of terminals connected with an access point, processing load at an access point and the like. In the case of EVDO, the information on the radio may include DRC value and RRI value, the value of various parameters used for scheduling in the radio section. The information on the radio system is statistically processed in the monitoring node 704. Moreover, in addition to the information on the radio statistically processed, the priority of radio systems are set for the following communication by taking into account the space information such as the position or direction of moving of terminals 701.

If EVDO is selected for the radio system 1 in such a multimode system, the monitoring node 704, the control node 705, PDSN105 and the base station 102 constituting the EVDO system are linked up for paging. As shown in FIG. 1, this paging signal 30 includes the ID information in which the priority of the radio system for the following communication set by the control node 705 is set.

Now, we will describe below the procedure of deciding the radio system used in the following communication by the terminal side with reference to FIG. 1.

The terminal side receives the paging signal 30 including the ID information in which the priority of the radio system used in the following communication is set from the base station. On the base station side, the receiver 32 of the radio system 1 receives this paging signal 30.

And the terminal 701 stores the information on the radio system that the user requests to use in the processing unit 40. And the information is transmitted to the controller 38 of the radio system 1. And the receivers 32, 34 and 36 of radio systems receive signals corresponding to the beacon of each radio system. The information included in the signal corresponding to this beacon is transmitted to the controller 38 of the radio system 1. The controller 38 receives which radio system the terminal can use by the information included in the signals corresponding to this beacon.

The controller 38 of the radio system 1 decides the radio system to be used in the following communication based on the information on the radio system that the user requests to use on the terminal side, the information which radio system the terminal can use, and the paging signal 30 in which the priority information of the radio system in which the following communication is to be made transmitted from the base station. The power controller 39 set the receiver of the radio system used in actual communication in an active state and the receiver of other radio systems in the sleep state.

Now, we will describe the operation of the terminal side after having decided the radio system in which the following communication is to be made in the controller 38 of the radio system 1 of the terminal side.

Figure 3:
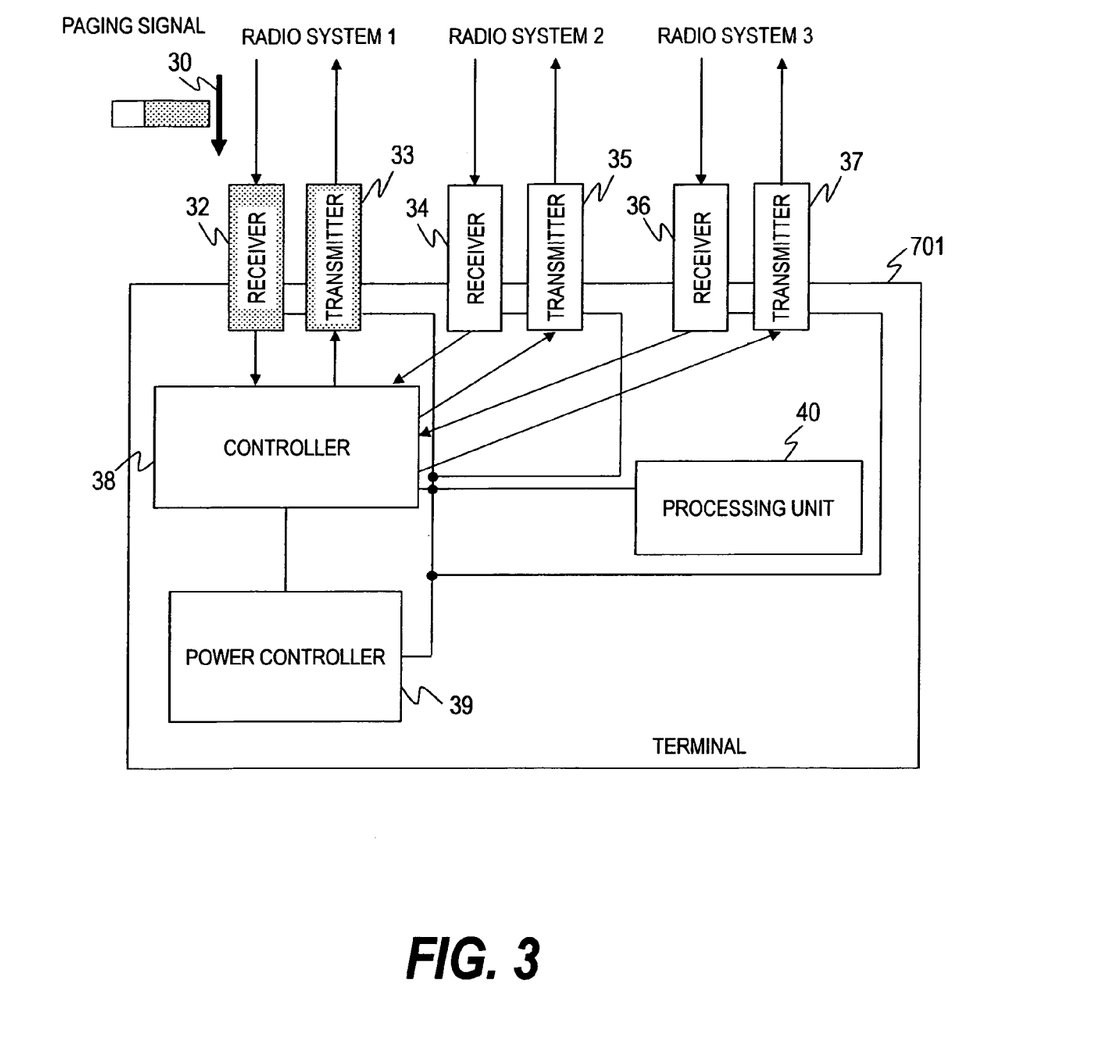
FIG. 3 is an explanatory diagram showing an operation of the terminal in accordance with the first embodiment of the present invention.

The controller 38 of the radio system 1 decides that the radio system to be used for the following communication will be the radio system 1 based on the paging signal 30 described above and the information from the terminal. Then, the power controller 39 sets the receiver 34 of the radio system 2, the transmitter 35 of the radio system 2, the receiver 36 of the radio system 3 and the transmitter 37 of the radio system 3 in the sleep state.

Figure 4:
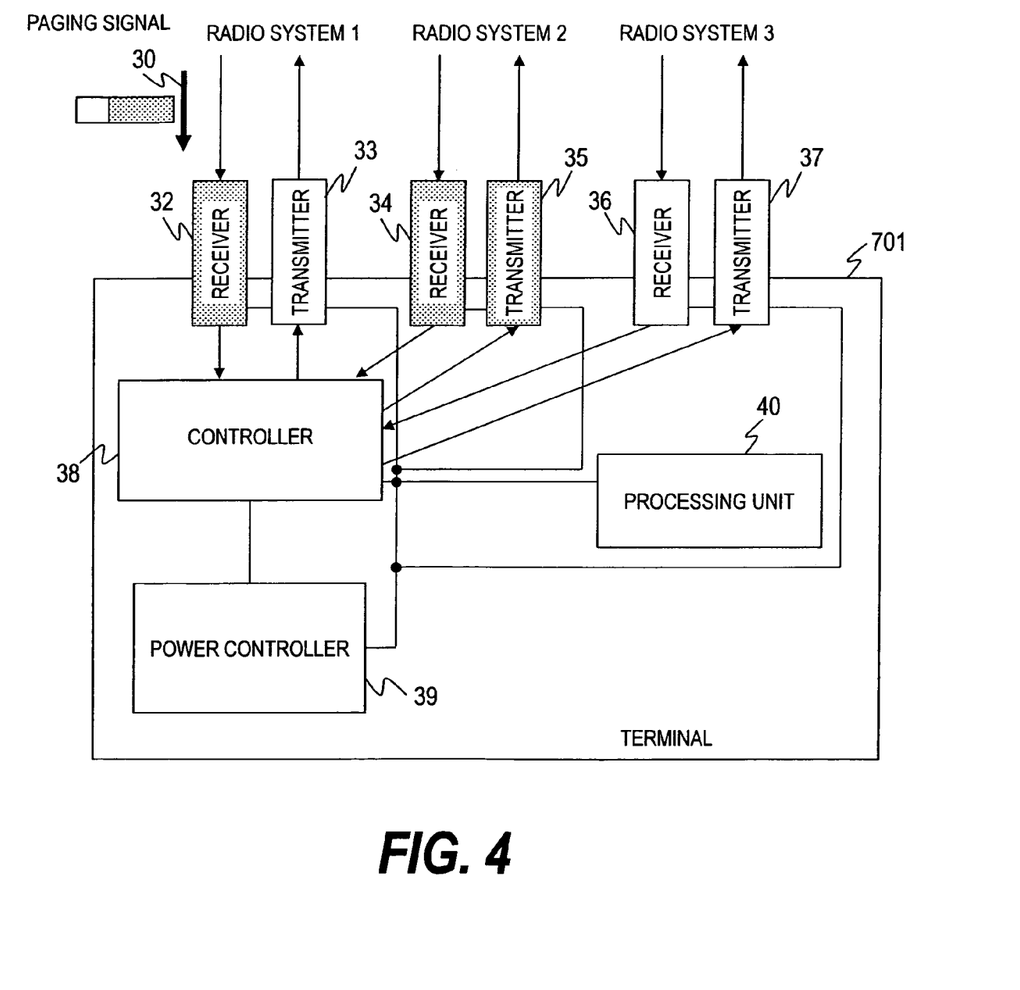
FIG. 4 is an explanatory diagram showing an operation of the terminal in accordance with the first embodiment of the present invention.

Now, we will describe the operation on the terminal side after the controller 38 of the radio system 1 on the terminal side has decided the radio system to be used in the following communication with reference to FIG. 4. FIG. 4 is an explanatory diagram showing an operation of a terminal device, such as a mobile terminal device, when the radio system to be used in the following communication is the radio system 2.

the controller 38 of the radio system 1 decides that the radio system to be used in the following communication shall be the radio system 2 based on the paging signal 30 described above and the information received from terminals. Then, the power controller 39 sets the receiver 34 and the transmitter 35 of the radio system 2 in an active state, and sets the transmitter 33 of the radio system 1, the receiver 36 of the radio system 3 and the transmitter 37 of the radio system 3 in a sleep state.

Figure 5:
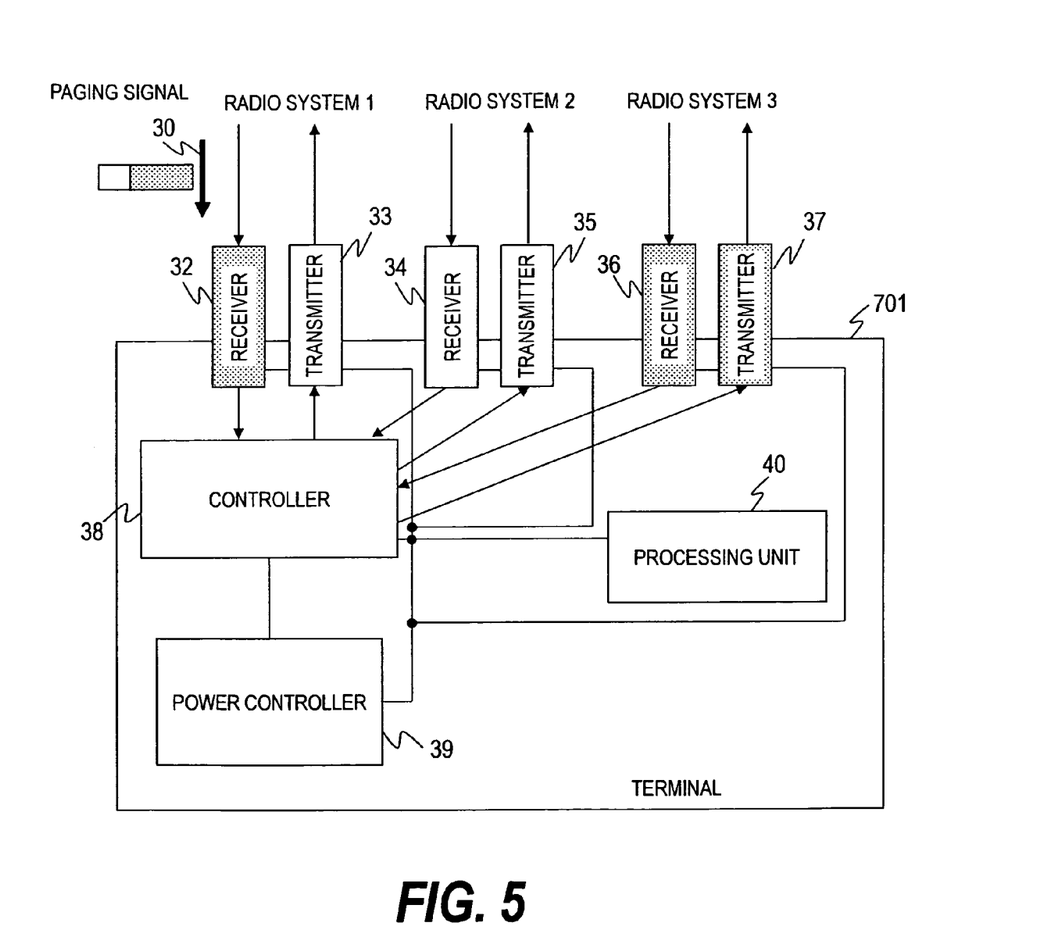
FIG. 5 is an explanatory diagram showing an operation of the terminal in accordance with the first embodiment of the present invention.

Now, we will describe below the operation on the terminal side with reference to FIG. 5 after the controller 38 of the radio system 1 on the terminal side has decided the radio system to be used in the following communication.

Based on the paging signal 30 described above and the information received from terminals, the controller 38 of the radio system 1 decides that the radio system to be used in the following communication shall be the radio system 3. Then, the power controller 39 sets the receiver 36 and the transmitter 37 of the radio system 3 in an active state, and sets the transmitter 33 of the radio system 1, the receiver 34 of the radio system 2 and the transmitter 35 of the radio system 2 in the sleep state.

Figure 6:
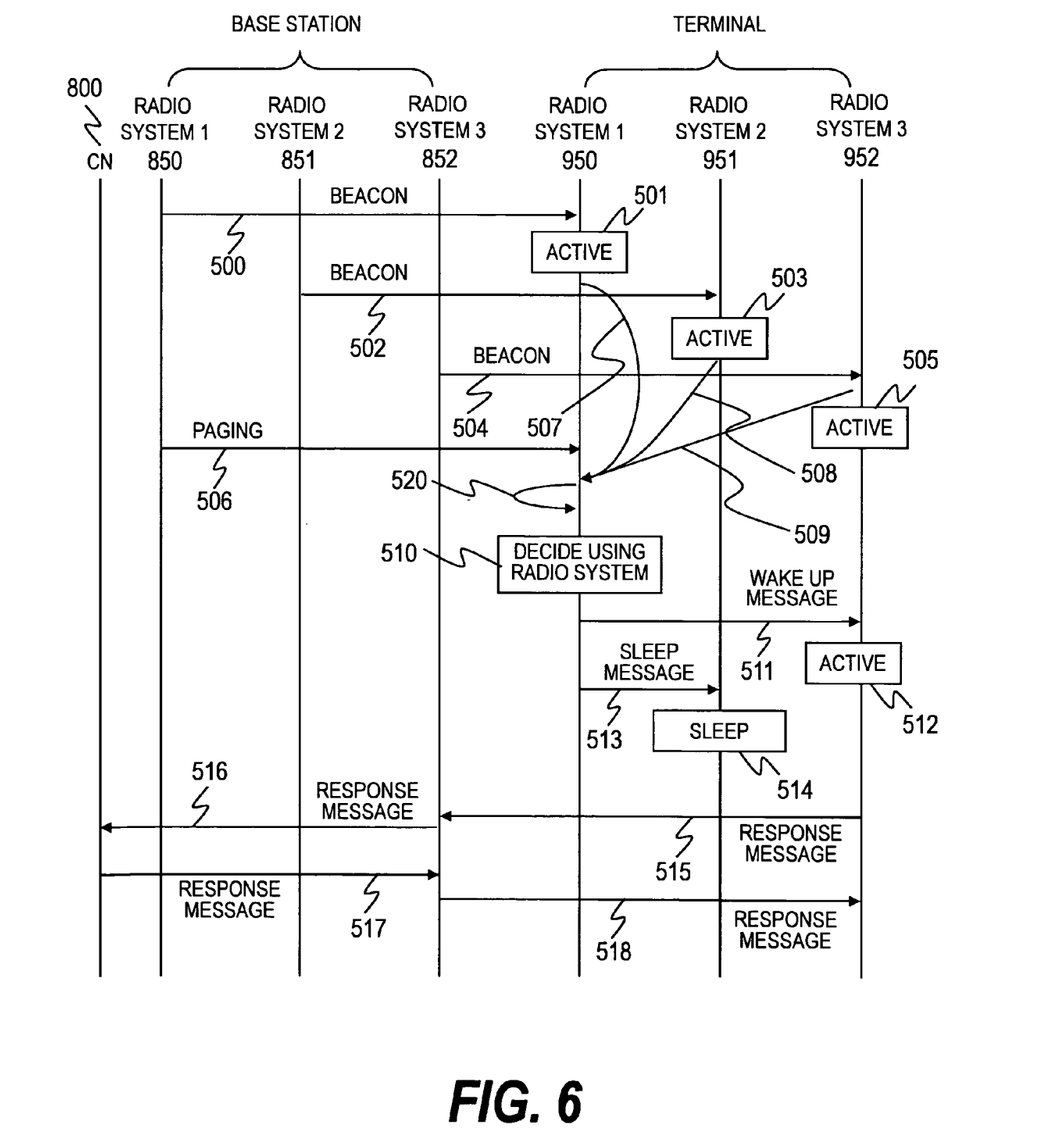
FIG. 6 is a sequence diagram in accordance with the first embodiment of the present invention.

We will describe the communication procedure according to the first embodiment of the present invention with reference to FIG. 6. FIG. 6 is a sequence diagram according to the first embodiment of the present invention.

The system 850 of the radio system 1 of the base station transmits signals 500 corresponding to the beacon to the system 950 of the radio system 1 of the terminals. The system 851 of the radio system 2 of the base station transmits signals 502 corresponding to the beacon to the system 951 of the radio system 2 of the terminals. The system 852 of the radio system 3 of the base station transmits signals 504 corresponding to the beacon to the system 952 of the radio system 3 of the terminals. The terminal is set in an active state upon reception of the beacon (501, 503, 505).

The paging signal 506 which includes the priority of the radio system to be used in the following communication is transmitted from the system 850 of the radio system 1 on the side of the base station to the system 950 of the radio system 1 of the terminal. the system 950 of the radio system 1 of the terminal decides the radio system to be used in the following communication based on the information on the radio system 520 desired by the terminal side and the information 507, 508 and 509 transmitted by the system of each radio system (510)

the system 950 of the radio system 1 of the terminal transmits a wake up message to the system 952 of the radio system 3 upon a decision to use the radio system 3 for the following communication (511), setting the system 952 of the radio system 3 in an active state (512). And it transmits a sleep message to the system 951 of the radio system 2 (513) to set the system 951 of the radio system 2 in the sleep state (514).

The system 952 of the radio system 3 of the terminal transmits a response message to the system 852 of the radio system 3 of the base station (515), and the system 952 of the radio system 3 of the base station transmits a response message to the CN (correspond node) 800, its partner in communication (516). CN 800 transmits a response message to the system 852 of the radio system 3 of the base station (517). The system 852 of the radio system 3 of the terminal transmits a response message to the system 952 of the radio system 3 of the terminal (518).

Figure 7:
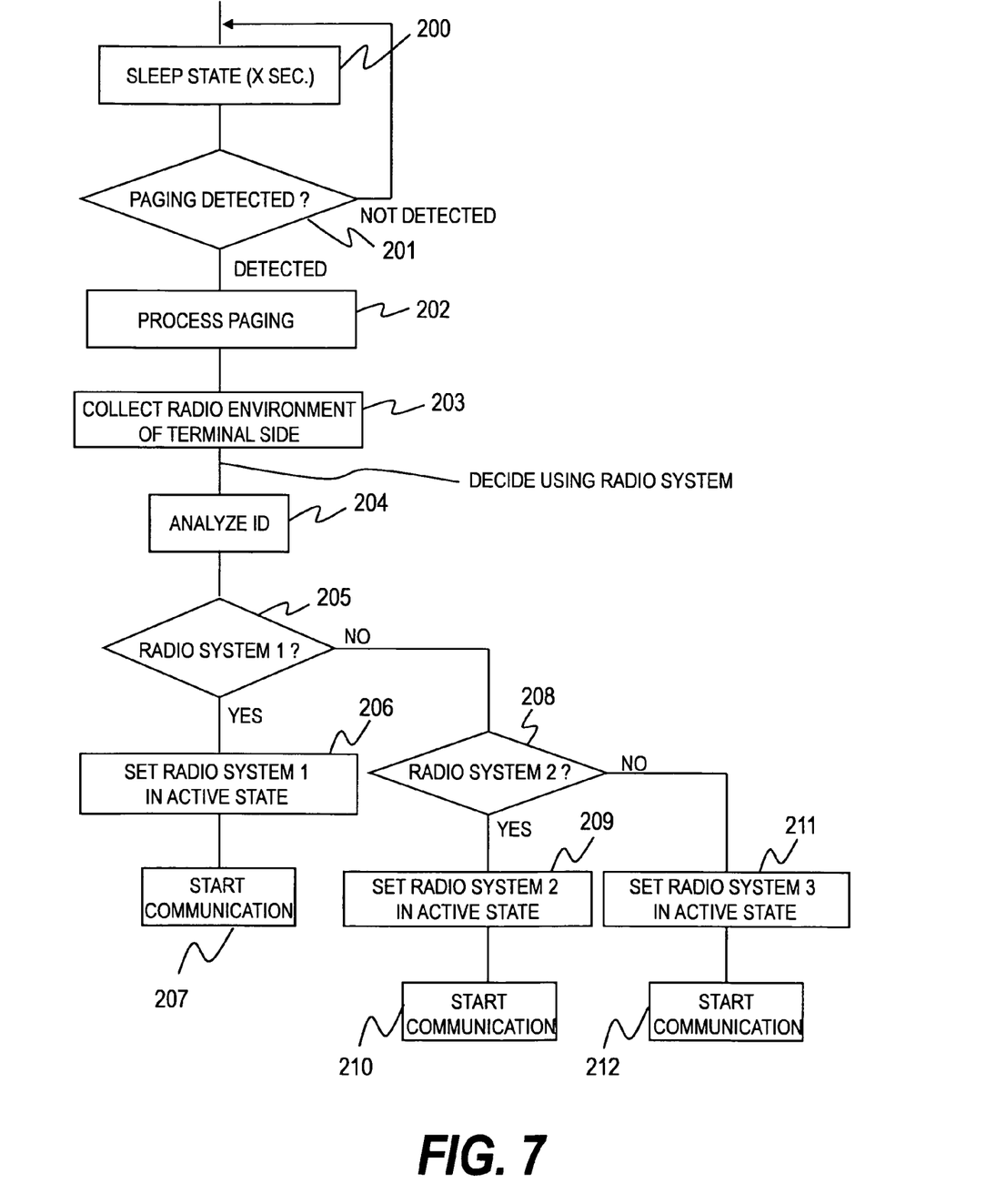
FIG. 7 is a flowchart showing an operation of the terminal in accordance with the first embodiment of the present invention.

Now, we will describe the operation of the terminal side with reference to FIG. 7. FIG. 7 is a flowchart showing the operation of the terminal side according to the first embodiment of the present invention.

The terminal is in a sleep state after the elapse of a predetermined length of time (X seconds) from the moment when the last communication was made (200). Then, it awaits the paging signal in which the priority of radio system which includes the following communication is to be made and transmitted from the base station (201). As a result, the terminal returns to the sleep state again if no paging signal is detected (200). While the terminal will process paging if any paging signals are detected (202).

Then, the terminal obtains the information on the radio system of the terminal side (203). The information on the radio system may includes the information on the radio system that the terminal side can actually use and the information on the radio system that the terminal side requests to use. The terminal analyses the radio system ID and decides the radio system in which the following communication will be made on the terminal side based on the priority information of radio systems included in the paging signal received from the base station and the obtained information on the radio system of the terminal side (204).

Then, the terminal side determines whether the information on the decided radio system designates the radio system 1 or not (205). If the ID information of the radio system 1 is designated, the terminal side sets the radio system 1 in an active state (206) to start communication (207). On the other hand, if the radio system 1 is not designated, the terminal side determines whether the ID information of the radio system 2 is designated or not (208). If the radio system 2 is designated, the terminal side sets the radio system 2 in an active state (209) to start communication (210). On the other hand, if the radio system 2 is not designated, the terminal side sets the radio system 3 in an active state (211) to start communication (212).

Incidentally, although the receiver that bas been in the sleep state does not pass to an active state even if paging signals are detected, the receiver may be programmed to receive periodically paging signals. In this case, the time interval of receiving paging signals may be changed according to the radio system that is in an active state.

Figure 8:
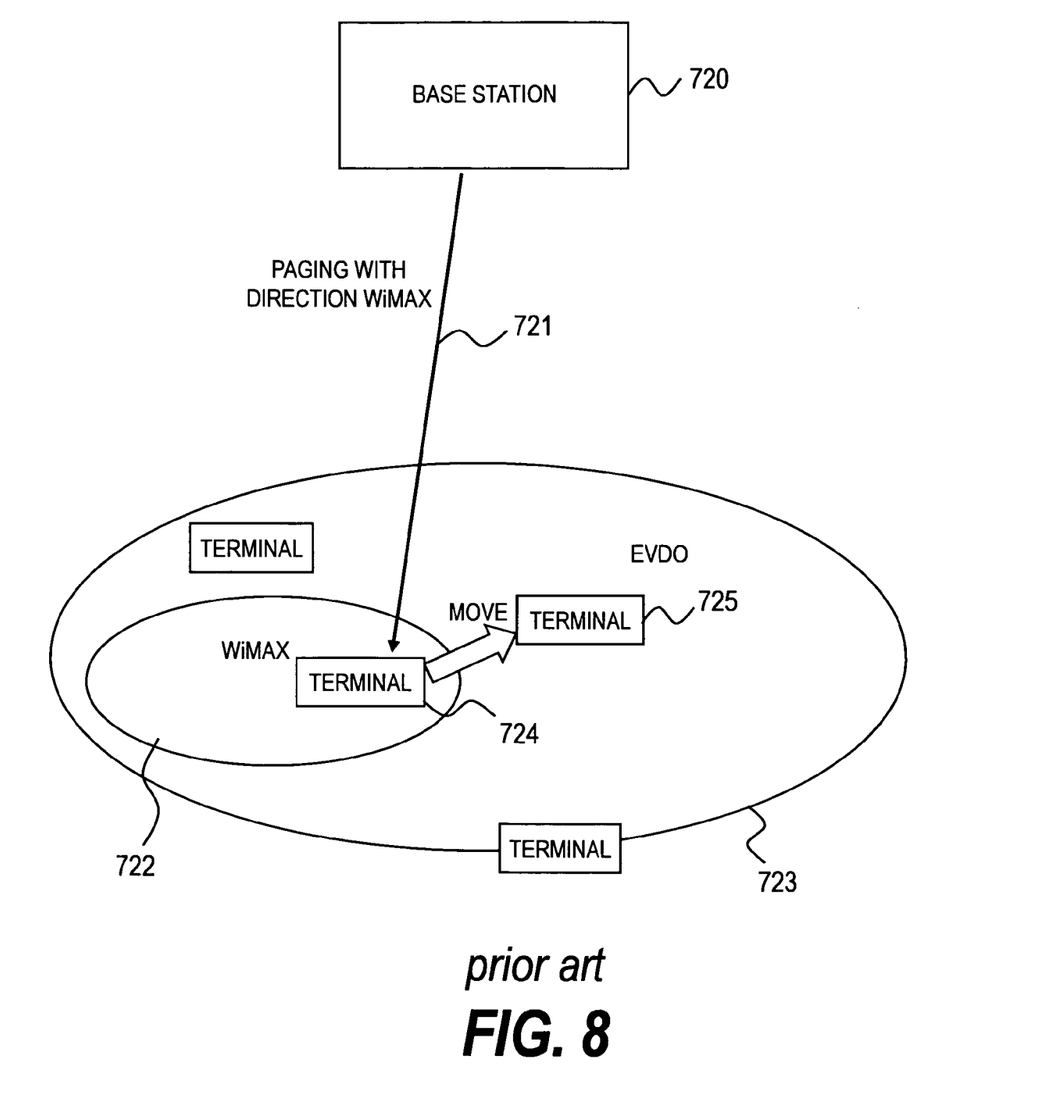
FIG. 8 is an explanatory diagram showing a configuration of a network of the multimode radio system in accordance with the conventional technologies.
Figure 9:
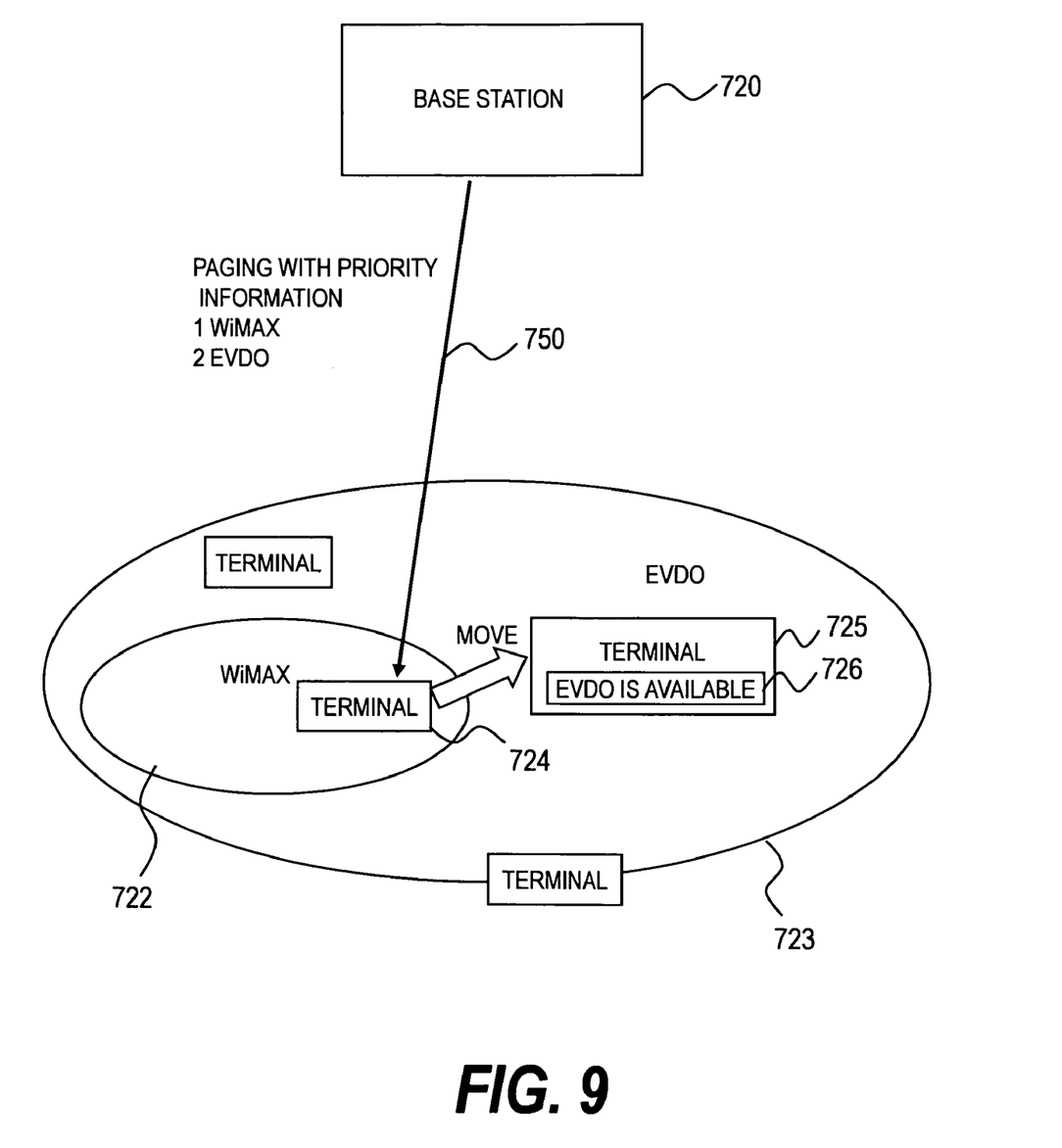
FIG. 9 is an explanatory diagram showing a configuration of a network of the multimode radio system in accordance with a first embodiment of the present invention.

We will describe the operation of the radio system according to the first embodiment with reference to FIG. 8 and FIG. 9.

According to the traditional method shown in FIG. 8, if for example, WiMAX is designated as the radio system by the paging signal 721 from the base station 720, if the terminal 724 that has been in the WiMAX communication area 722 has moved and has gone out of the WiMAX communication area 722 and if the terminal 725 has moved to an area 723 where only EVDO can communicate, the terminal 725 will be unable to communicate. However, as shown in FIG. 9 according to the embodiment of the present invention, the paging signal 720 from the base station designates the priority information of the radio system to be used by the terminal (for example, 1 WiMAX, 2 EVDO). And if the terminal side is waiting for the information 726 that actually EVDO is available, it will be possible to communicate even if the terminal 724 has moved from the WiMAX communication area 722 to the EVDO communication area 723.

Figure 10:
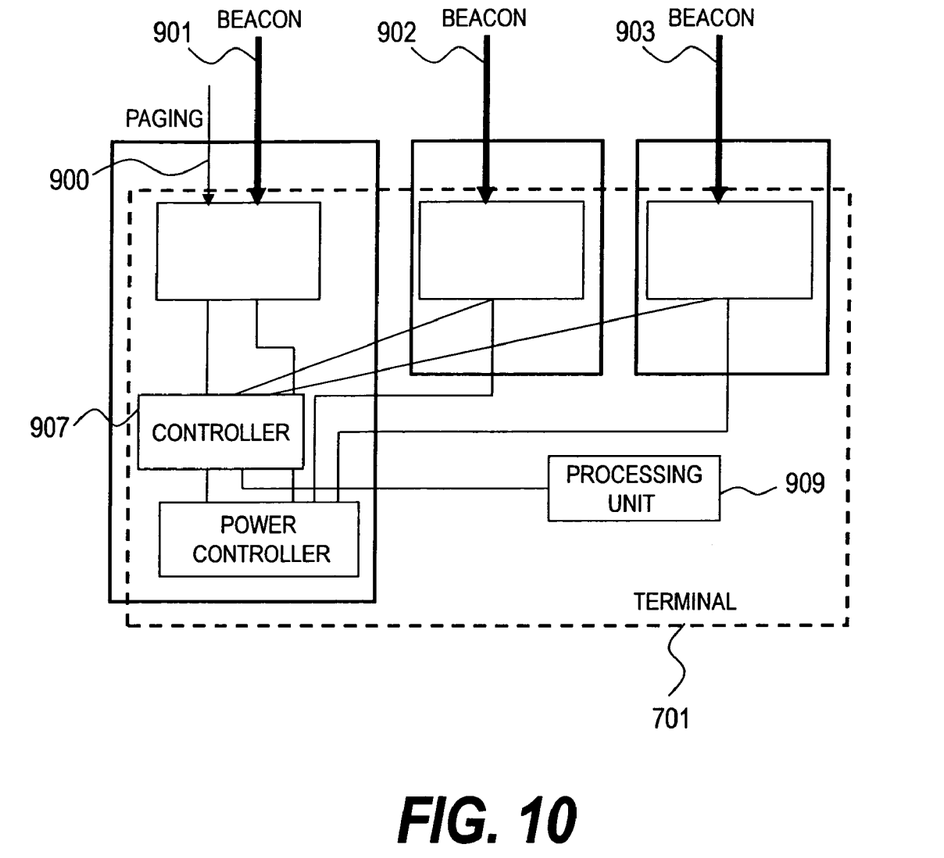
FIG. 10 is a block diagram showing a information obtaining function of the terminal in accordance with a first embodiment of the present invention.

Next, We will describe the function of collecting information on the terminal side of the first embodiment with reference to FIG. 10.

The terminal receives signals 901-903 corresponding to the beacon in each radio system in addition to the paging signal 900 of the radio system 1. Each terminal will be able to identify which radio system is available by this signal corresponding to the beacon. The information on the available radio system and the information on the radio system that includes user requests to use in the processing unit 909. The processing unit 909 transmits the information on the radio system on the terminal side to the controller 907. The paging signal with priority designated by the terminal side is transmitted to the controller 907. The controller 907 decides the radio system in which the following communication will be made based on the information received from the base station and the information on the radio system on the terminal side. Then, the power controller 909 transmits a wake up message to the transmitter and receiver of the radio system in which actual communications will be made, and transmits a sleep message to the transmitter and the receiver in which actual communication will not be made.

As described above, according to the first embodiment of the present invention, the base station side sets the priority of the radio system in which the following communication will be made and transmits the information to the terminal side by the paging of the radio system 1. The terminal side obtains the information on the radio system that the terminal side requests to use and the information on the actually available radio system, and based on the information from the base station side and the information from the terminal side, decides the radio system in which the following communication will be made. By this measure, it will be possible to prevent the disruption of communication due to changes in the radio wave condition and to realize switching of radio systems adapted to the radio condition.

Second Embodiment

According to the first embodiment described above, the base station side decides the priority of the radio system in which the following communication will be made, transmits the information to the terminal by the paging signal 30 of the radio system 1, and the terminal side decided the radio system in which the following communication will be made. However, in the second embodiment which we will describe below, the base station side decides the priority of the radio system in which the following communication will be made, receives the information on the radio system that the terminal side requests to use and the information on the radio system that the terminal side actually can use, and decides the radio system in which the following communication will be made. In this case, the ID information of the radio system in which the following communication will be made decided by the base station side will be transmitted to the terminal side by the paging information 30.

Figure 11:
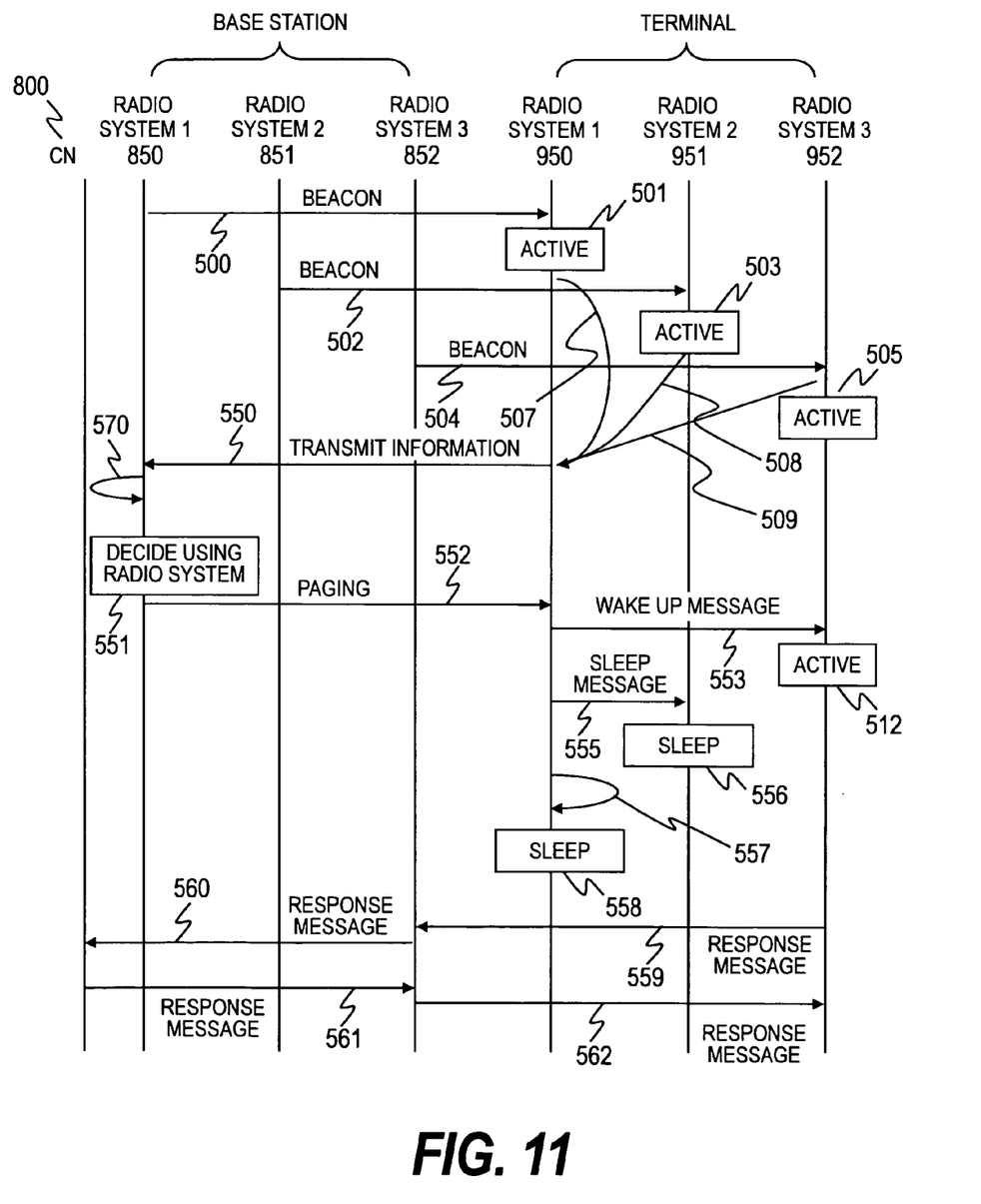
FIG. 11 is a sequence diagram in accordance with a second embodiment of the present invention.

We will describe the communication procedure according the second embodiment of the present invention with reference to FIG. 11. FIG. 11 is a graphic of sequence according to the second embodiment of this invention.

The system 850 of the radio system 1 of the base station transmits signal 500 corresponding to the beacon to the system 950 of the radio system 1 of the terminal. The system 851 of the radio system 2 of the base station transmits signal 502 corresponding to the beacon to the system 951 of the radio system 2 of the terminal. The system 852 of the radio system 3 of the base station transmits signal 504 corresponding to the beacon to the system 952 of the radio system 3 of the terminal. The terminal turns into an active state upon reception of the beacon (501, 503, 505).

The system 950 of the radio system 1 of the terminal transmits the information on the radio system that the terminal side requests to receive and the information transmitted from the system of each radio system 507, 508 and 509 (550). Based on the information 570 with the priority of the radio system in which the following communication will be made set and the information 550 transmitted from the terminal, the system 850 of the radio system 1 of the base station decides the radio system in which the following communication will be made (551). The information on the decided radio system will be transmitted to the system 950 of the radio system 1 of the terminal (552).

If a decision has been made that the communication will be made by the radio system 3, the system 950 of the radio system 1 of the terminal transmits a wake up message to the system of the radio system 3 of the terminal (553), and set the system of the radio system 3 of the terminal in an active state (554). And the system 950 of the radio system 1 of the terminal transmits a sleep message to the system 951 of the radio system 2 (555) to set the system 951 of the radio system 2 in a sleep state (556). And the system 950 of the radio system 1 of the terminal may transmit a sleep message to the system 950 (itself) of the radio system 1 (557) to set the system 950 of the radio system 1 in a sleep state (558).

The system 952 of the radio system 3 of the terminal transmits a response message to the system 852 of the radio system 3 of base station (559), and the system 852 of the radio system 3 of the base station transmits a response message to a CN (Correspond Node) 800 (560). The CN 800 transmits a response message 995 to the system of the radio system 3 of the base station (861). The system 852 of the radio system 3 of the terminal transmits a response message to the system 952 of the radio system 3 of the terminal.

Figure 12:
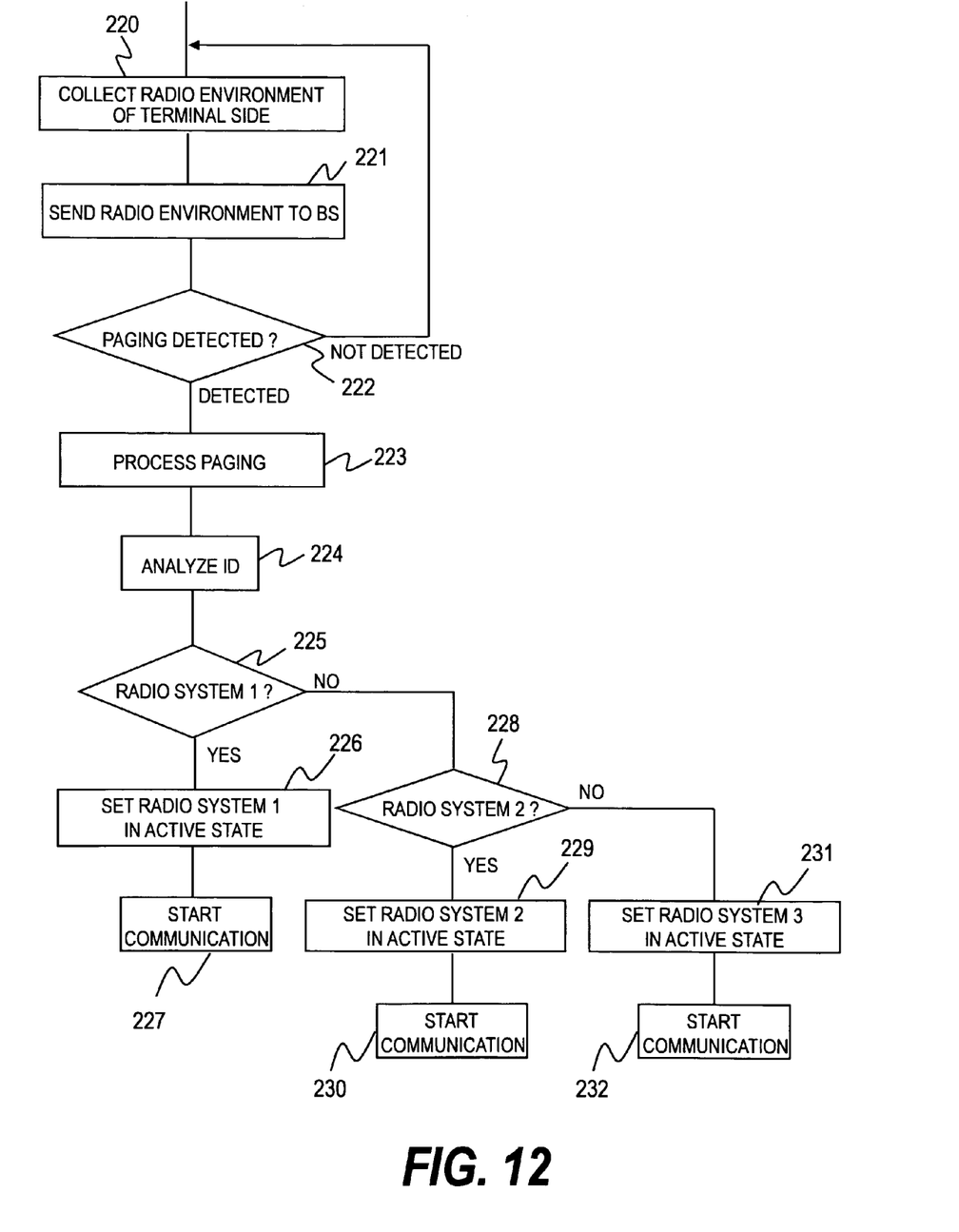
FIG. 12 is a flowchart showing an operation of the terminal in accordance with the second embodiment of the present invention.

Then, we will describe the operation of the base station side with reference to FIG. 12. FIG. 12 is a flowchart showing the operation on the terminal side according to the second embodiment of the present invention.

The terminal obtains information on the radio system on the terminal side (220). The information on the radio on the terminal side may includes the information on the radio system that the terminal side can actually use and the information on the radio system that the terminal side requests to use. Then, the terminal transmits the obtained information on the radio to the base station (221). The base station side decides the radio system in which the following communication will be made based on the priority information of radio system and the information on the radio received from the terminal side, and transmits the information on the decided radio system by paging signals to the system 950 of the radio system 1.

The system 950 of the radio system 1 of the terminal awaits for paging signals transmitted by the base station (222). As a result, if no paging signals can be detected, the system 950 of the radio system 1 obtains again information on the radio system of the terminal (220). Upon detection of a paging signal, it proceeds to the receiving operation of the paging signal (223), analyzes the ID of radio system contained in the paging signal and decides the radio system in which the following communication will be made by the terminal side.

Then, it determines whether the information on the decided radio system designates the radio communication 1 or not (225). If the ID information of the radio system 1 is designated, it sets the radio system 1 in an active state (226) and starts communication (227). On the other hand, if the radio system 1 is not designated, it will determine whether the ID information of the radio system 2 is designated or not (228). If the radio system 2 is designated, it sets the radio system 2 in an active state (229) and starts a communication (230). On the other hand, if the radio system 2 is not designated, it sets the radio system 3 in an active state (231), and starts a communication.

As described above, in the second embodiment of the present invention, the terminal side obtains the information on the radio system that it requests to use and the information on the radio system actually available and transmits them to the base station side. The base station side sets the priority of the radio system in which the following communication will be made and based on the information supplied by the base station side and the information supplied by the terminal side, it will decide the radio system in which the following communication will be made. The base station side transmits the information on the radio system that has been decided in which the following communication will be made to the terminal side by the paging of the radio system 1. Based on the information received from the base station, the terminal side switches the radio systems. This will enable to prevent communications from being disrupted by changes in the radio wave condition and realize switching of radio systems according to the radio condition.

While the present invention has been described in detail and pictorially in the accompanying drawings, the present invention is not limited to such detail but covers various obvious modifications and equivalent arrangements, which fall within the purview of the appended claims.

What is claimed is:

1. A radio communication system, comprising:
   a base station implementing a plurality of radio systems, and
   a plurality of terminals for communicating with the base station using the plurality of radio systems, each of the terminals comprising a plurality of transmitters, a plurality of receivers, and a controller for controlling the transmitters and the receivers, each transmitter and each receiver of each of the terminals corresponding to a radio system of the plurality of radio systems, wherein
   the base station decides a priority of radio systems of the plurality of radio systems that each of the terminals will use to communicate thereafter and transmits paging signals of one of the plurality of radio systems which include priority information indicating the decided priority of radio systems of the plurality of radio systems that each of the terminals will use to each of the terminals,
   the controller of each terminal decides the radio systems to use for communication based on the priority information included in the paging signals transmitted from the base station, obtained information on the radio systems available for the terminal to use, and information on a radio system that the terminal requests to use, and
   the controller of each terminal sets the receiver of the terminal that corresponds to the radio system decided to be used for communication in an active state when the radio system decided to be used for communication is different from the radio system used by the terminal for receiving the paging signals and the terminal is set to the sleep state for the radio system decided to be used for communication.

2. The radio communication system according to claim 1, further comprising a monitoring node coupled with the base station,
   wherein the base station comprises access points for each of the radio systems, gateways terminating each of the radio systems, and a control node for controlling the gateways,
   wherein the monitoring node obtains states of the radio systems, and
   wherein the control node decides the priority of the radio systems each of the terminals will use to communicate thereafter based on the state of each of the radio systems obtained by the monitoring nodes, the information on the radio systems available for each of the terminals to use, and the information on the radio system that each of the terminals requests to use.

3. The radio communication system according claim 2,
   wherein the monitoring node obtains at least a piece of information on RSSI (Received Signal Strength Indication), packet loss, transmission rate of each of the terminals, a number of the terminals coupled with each of the access points, and processing load of each of the access points, and
   wherein the control node converts the information obtained from the radio systems at different timing into comparable forms, and decides the priority of the radio systems each of the terminals will use to communicate thereafter based on the converted information by taking into account a position and a direction of movement of each of the terminals.

4. The radio communication system according to claim 2, wherein
   the control node selects the radio system to be used to transmit the paging signals based on the information obtained by the monitoring node and the information on the radio system that each of the terminals requests to use, and
   instructs the gateway to send the paging signals including priority information from the access points.

5. The radio communication system according to claim 4, wherein the base station implements a first radio system having a wide communication area and a second communication system having a narrower communication area than the first radio system, wherein the control node controls to transmit the priority information on the decided priority of the radio systems each of the terminals will use to communicate thereafter by the paging signals of the first radio system if the first radio system is available, and wherein the control node controls to transmit the priority information on the decided priority of the radio systems each of the terminals will use to communicate thereafter by the paging signals of a second radio system if the first radio system is not available.

6. The radio communication system according to claim 1, wherein the controller of each terminal obtains the information on the available radio systems by referring to a beacon signal of the radio systems, and stores the obtained information on the available radio systems and information on the radio system that the terminal requests to use.

7. The radio communication system according to claim 1, wherein, for each terminal, the controller sets the receiver of each radio system not decided to be used for communication in the sleep state.

8. The radio communication system according to claim 7, wherein, for each terminal, the receiver of each radio system which is set in the sleep state changes a time interval of receiving paging signals depending on each radio system for which the corresponding receiver is in the active state.

9. The radio communication system according claim 7, wherein, for each terminal, the receiver of each radio system which is set in the sleep state does not wake up even if the paging signal is detected.

10. The radio communication system according to claim 1, wherein the base station decides the priority of the radio systems that each of the terminals will use to communicate thereafter based on at least one item of information that is obtained by the base station on a received signal value, a throughput, a position of each of the terminals, or a direction of movement of each of the terminals.

* * * * *